Feb. 14, 1961   G. V. KINGSLEY ET AL   2,971,248
COMPOSITE BEARINGS AND METHOD OF FORMING THE SAME
Filed Jan. 27, 1958
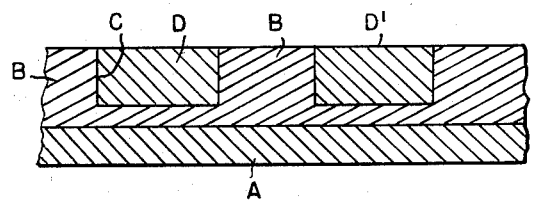
FIG.I.
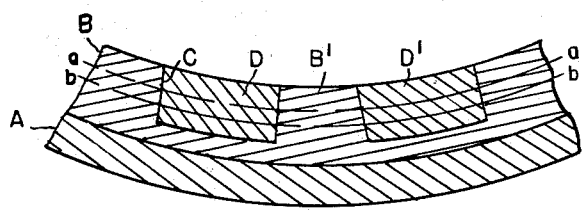
FIG.2.
FIG.3.
FIG.4.
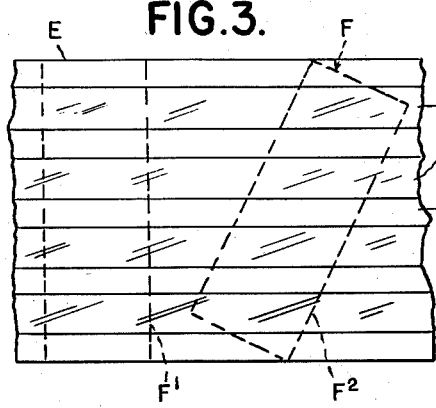
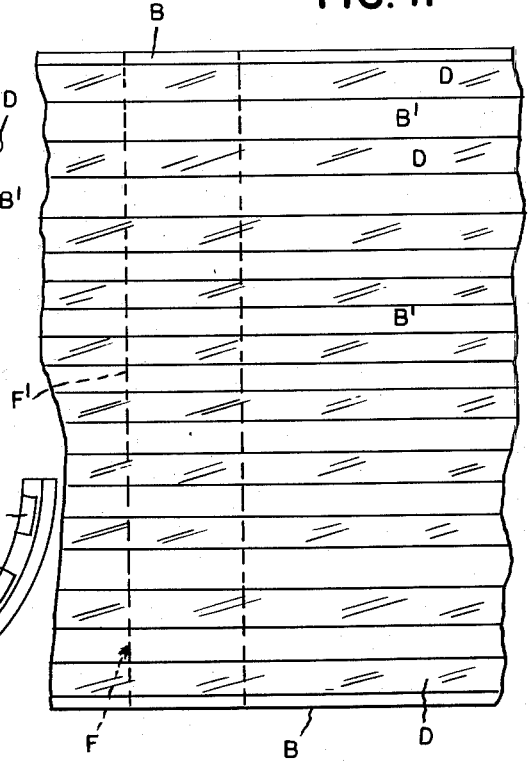
FIG.5.
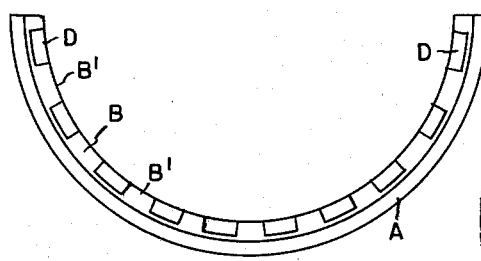
FIG.6.
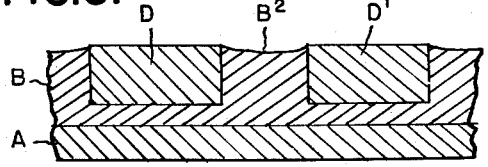
INVENTORS
GERALD V. KINGSLEY
BY WILBUR E. WYATT
Whittemore Hulbert + Belknap
ATTORNEYS

2,971,248

COMPOSITE BEARINGS AND METHOD OF FORMING THE SAME

Gerald V. Kingsley, Detroit, Mich., and Wilbur E. Wyatt, Greensburg, Ind., assignors to Bohn Aluminum & Brass Corporation, Detroit, Mich., a corporation of Michigan Filed Jan. 27, 1958, Ser. No. 711,305

7 Claims. (Cl. 29—149.5)

The invention relates to bearings of that type comprising distributed portions formed, respectively, of materials having different characteristics. One such construction heretofore used has a lining formed of silver with distributed inlays therein of Babbitt metal. It has been found that the load sustaining power of the former and the good bearing qualities of the latter will to a considerable extent be imparted to the bearing as a whole. The method of forming such construction as heretofore practiced involves the following steps:

(1) Forming on the reinforcing structure of the bearing an inner layer of silver;

(2) Broaching or otherwise fashioning this layer to the dimension of the bearing surface;

(3) Knurling said surface to form distributed depressions or recesses therein;

(4) By electrolytic deposition covering the entire knurled surface with babbitt and to a thickness at least equal to the depth of the said depressions;

(5) Rebroaching to the same internal dimension and thereby exposing the silver and babbitt filled depressions therebetween in one continuous surface.

As the knurled depressions taper in an inward direction it is important that the rebroaching should not be of greater depth than the original, as this would reduce the area of babbitt surface relative to that of the silver.

It is the object of this invention to simplify the process of forming such type of bearing and further to obtain a superior product. In particular it is an object to obtain a construction in which the depressions filled with the softer metal are substantially constant in cross sectional area throughout their depth so as to remain the same with different depths of broaching. It is a further object to render it possible to form bearing liners of this type from strip material. With these objects in view the invention consists in the construction and method of forming the same as hereinafter set forth.

Bearings for many modern industrial uses must be capable of carrying greater loads and at higher relative velocities than in times past. Consequently a material, such as the well known Babbitt metal, so extensively used for lining bearings is of itself no longer always satisfactory. Many new materials, such for instance as aluminum alloys, are now available but no one possesses to the required degree all of the essential characteristics, hence the need of a combination structure, such as above referred to. The specific materials of which this improved bearing is formed are not essential but they may be generally described as having to a high degree, respectively, load sustaining and anti-seizure bearing characteristics. Different specific methods may also be used for forming the bearing but we will describe herein one for forming bearing liners of our improved construction.

In the accompanying drawings:

Fig. 1 is a cross section through a part of a strip from which bearing liner blanks may be severed showing portions formed of different materials in relation to each other.

Fig. 2 is a similar view of a portion of the arcuate bent liner blank.

Fig. 3 is a plan view of a portion of the strip of full width illustrating the distribution thereover of the materials having different characteristics.

Fig. 4 is a similar view of a modified construction showing in dotted lines a liner blank to be cut therefrom.

Fig. 5 is a cross section through a complete arcuate liner formed from the blank in Fig. 4.

Fig. 6 is a view similar to Fig. 1 showing a modified construction.

As shown in Fig. 1, A is a backing strip formed of steel or any other material having the required degree of strength. One face of this strip is clad with a bearing material B applied thereto by any suitable method and having one of the characteristics essential to the combination bearing structure, preferably that of high load sustaining power. Depressions C are formed in the material B, preferably grooves spaced from each other and running longitudinally of the strip. The opposite sides of each of these grooves are parallel to each other so that the groove is of the same width throughout its entire depth. The grooves are then filled with a material D having a different characteristic from that of the portion B, preferably of anti-seizure quality. Suitable specific materials for forming this structure are aluminum alloy for the portion B and Babbitt metal for the portion D. E designates the strip as a whole from which blanks F for forming liners may be severed. The dimension of the blank which is subsequently bent into arcuate form extends transversely of the strip E and may be either at right angles thereto, as indicated in dotted lines at F', or at an oblique angle, as at F². The blank may then be bent into its arcuate form, as in Fig. 2, for engagement with the reinforcing bearing structure (not shown). It is then broached or otherwise machined to form a bearing surface of a radius corresponding to that of the rotary member (not shown) for which the bearing is designed. Two such surfaces of different radius are indicated by the dotted lines a—a and b—b, Fig. 2. It will be noted that the width of the portions D on each of these lines is the same. Also that the width of the portion B' intermediate a pair of portions D and D' is substantially the same on lines a—a and b—b. Consequently the ratio of the area of surface portion D to that of surface portion B' remains the same on each of these lines, the difference in circumferential lengths thereof being negligible.

In bearings for rotary members there is a difference of load on certain portions of the circumference to that on other portions. It may therefore be desirable to vary the width of the portions D and the spacing thereof. For instance with a gravitational load it would be greatest adjacent to a vertical line passing through the axis of the bearing. In this portion the spacing of the grooves and their width may be less than at the opposite sides of the bearing or the ratio of the areas of the portions B and B' may be altered. Such construction is illustrated in Figs. 4 and 5.

To increase the strength of bond between the material in the grooves and the side walls thereof the portion B as originally formed may be slightly concaved in its upper surface between the grooves at B², Fig. 6. After the filling of these grooves rolling of the strip to flatten its upper surface will increase with pressure against the insert.

While we have above described only grooves for receiving the insert material, it is obvious that the form of the recess is immaterial as long as it remains of constant cross section throughout its depth. The advantage of the groove over other shapes is that it may be more readily formed to maintain such constant cross section.

What we claim as our invention is:

1. A bearing blank adapted to be bent into arcuate form to constitute a liner, comprising a flat metal strip having a surface portion of a certain bearing characteristic and provided with a series of parallel longitudinal grooves with side walls perpendicular to the surface of said strip, each groove being of constant cross sectional area and containing a metal of different bearing characteristic, in which the distribution and area of the portion having one characteristic is varied with respect to loads on different portions of the bearing to be subsequently formed from the strip.

2. In a method of forming bearings, the step of coating a backing strip with bearing material having a certain characteristic, forming spaced recesses in said coating with the walls thereof normal to its surface, filling said recesses with material having a different characteristic, concaving the surface of said coating intermediate said recesses and subsequent to the filling of the latter applying pressure to flatten out said concave portions, thereby pressing the walls of said recesses against the filling material therein.

3. The method of forming bearings which comprises mechanically forming in a flat metal strip having a certain bearing characteristic a series of parallel longitudinal grooves such that the side walls of said grooves are exactly perpendicular to the surface of said strip, in which the spacing and width of the several grooves in said parallel series are selected to provide a varying ratio of groove area to intermediate area in different portions of the longitudinal axis of the severed blank.

4. A bearing blank adapted to be bent into arcuate form to constitute a liner, comprising a flat metal strip having a surface portion of a certain bearing characteristic and provided with a series of parallel longitudinal grooves with side walls perpendicular to the surface of said strip, each groove being of constant cross sectional area and containing a metal of different bearing characteristic, said strip having varying spacing between the grooves thereby providing a variation in ratio of the metals of different characteristics in different portions of the liner.

5. A bearing blank adapted to be bent into arcuate form to constitute a liner, comprising a flat metal strip having a surface portion of a certain bearing characteristic and provided with a series of parallel longitudinal grooves with side walls perpendicular to the surface of said strip, each groove being of constant cross sectional area and containing a metal of different bearing characteristic, some of the grooves varying from others in cross sectional area, thereby providing a variation in ratio of the metals of different characteristics in different portions of the liner.

6. A bearing blank as in claim 5 in which the strip is aluminum-clad steel and the metal in the grooves is babbitt.

7. A bearing blank adapted to be bent into arcuate form to constitute a liner, comprising a flat metal strip having a surface portion of a certain bearing characteristic and provided with a series of parallel longitudinal grooves with side walls perpendicular to the surface of said strip, each groove being of constant cross sectional area and containing a metal of different bearing characteristic, the surface of the metal intermediate the longitudinal grooves being at a different level than the surface of the metal filling said grooves, whereby subsequent rolling of the strip to bring the two upper surfaces into a common plane will increase the binding pressure between the metals.

References Cited in the file of this patent
UNITED STATES PATENTS

| | | |
|---|---|---|
| 1,460,515 | Selker | July 3, 1923 |
| 2,498,873 | Blue | Feb. 28, 1950 |
| 2,517,430 | Hensel | Aug. 1, 1950 |
| 2,599,726 | Schlucter | June 10, 1952 |
| 2,615,768 | Schlucter | Oct. 28, 1952 |